United States Patent [19]

Slavens

[11] Patent Number: 4,631,386

[45] Date of Patent: Dec. 23, 1986

[54] WELDING HEAD APPARATUS

[76] Inventor: Clyde M. Slavens, Evans Automatic Welding Systems, Inc. P.O. Box 440,577, Houston, Tex. 77244

[21] Appl. No.: 610,316

[22] Filed: May 14, 1984

[51] Int. Cl.⁴ .......................... B23K 9/12; B23K 37/02
[52] U.S. Cl. ............................. 219/125.12; 219/125.1; 219/124.31
[58] Field of Search ........... 219/60 R, 124.31, 124.33, 219/136, 125.1, 125.12

[56] References Cited

U.S. PATENT DOCUMENTS

| | | | |
|---|---|---|---|
| 3,632,959 | 6/1972 | Nelson et al. | 219/124.33 X |
| 3,835,286 | 9/1974 | Kazlauskas | 219/125.1 X |
| 4,260,869 | 4/1981 | Slavens et al. | 219/124.31 |
| 4,331,278 | 5/1982 | Shever et al. | 219/124.31 X |

FOREIGN PATENT DOCUMENTS

6509216  1/1967  Netherlands .................... 219/125.1

Primary Examiner—Clarence L. Albritton
Assistant Examiner—C. M. Sigda
Attorney, Agent, or Firm—Carl B. Fox, Jr.

[57] ABSTRACT

Welding head apparatus, wherein a welding head assembly is mounted on a support plate which can be adjustably moved both vertically and horizontally, and of which the welding tip may be angularly adjusted and may be oscillated transversely of the weld joint. The apparatus is compact and light in weight so that it may be mounted on a welding carriage, either singly or in plural units for forming multiple weld beads in a single pass. The apparatus is self contained, including a wire feeder, so that separate assemblies for supporting the welding apparatus are not needed.

17 Claims, 9 Drawing Figures

Fig_8

WELDING HEAD APPARATUS

BACKGROUND OF THE INVENTION

Welding head apparatus designed for use on traveling welding carriages must be light in weight and fully adjustable, in order that the welding tip may be made to accurately follow the welding groove. Of course, such welding heads are not limited to use on traveling carriages, but may be equally suitably used in other locations. Heretofore, such welding head apparatuses have been excessively heavy and difficult to adjust, so that their use was not as simple and straightforward as was desired. This invention seeks to provide a welding head apparatus, and a support therefore, which fulfills the desired requirements.

SUMMARY OF THE INVENTION

The welding head apparatus according to this invention includes a support base which is slidably movably mounted for adjustment of the welding components transversly of the welding groove. The welding tip itself is angle adjustable along the length of the welding groove so that it may be readily adjusted as to its angle relative the welding groove. A welding tip height adjustment is provided which is capable of being used to move the tip away from the welding groove, and then to return it to its original position, so that adjustments need not be repeated. The welding head apparatus is of sufficiently small size that a plurality, up to three or four, of the welding heads may be carried by a single welding carriage, if desired.

A principal object of the invention is to provide welding apparatus which is compact, fully adjustable, exonomical, and simple and efficient in operation. Another object of the invention is to provide such welding head apparatus which includes a slidable mounting base for providing movement to and from a welding groove. Another object of the invention is to provide welding head apparatus affording oscillation of the welding tip whereby adequate bridging of the welding groove and superior welds may be achieved. A still further object of the invention is to provide such a welding head wherein the welding tip is pivotally adjustable.

Other objects and advantages of the invention will appear from the following detailed description of the preferred embodiments, reference being made to the accompanying drawings.

DESCRIPTIONS OF THE PREFERRED EMBODIMENTS

Figure 1:
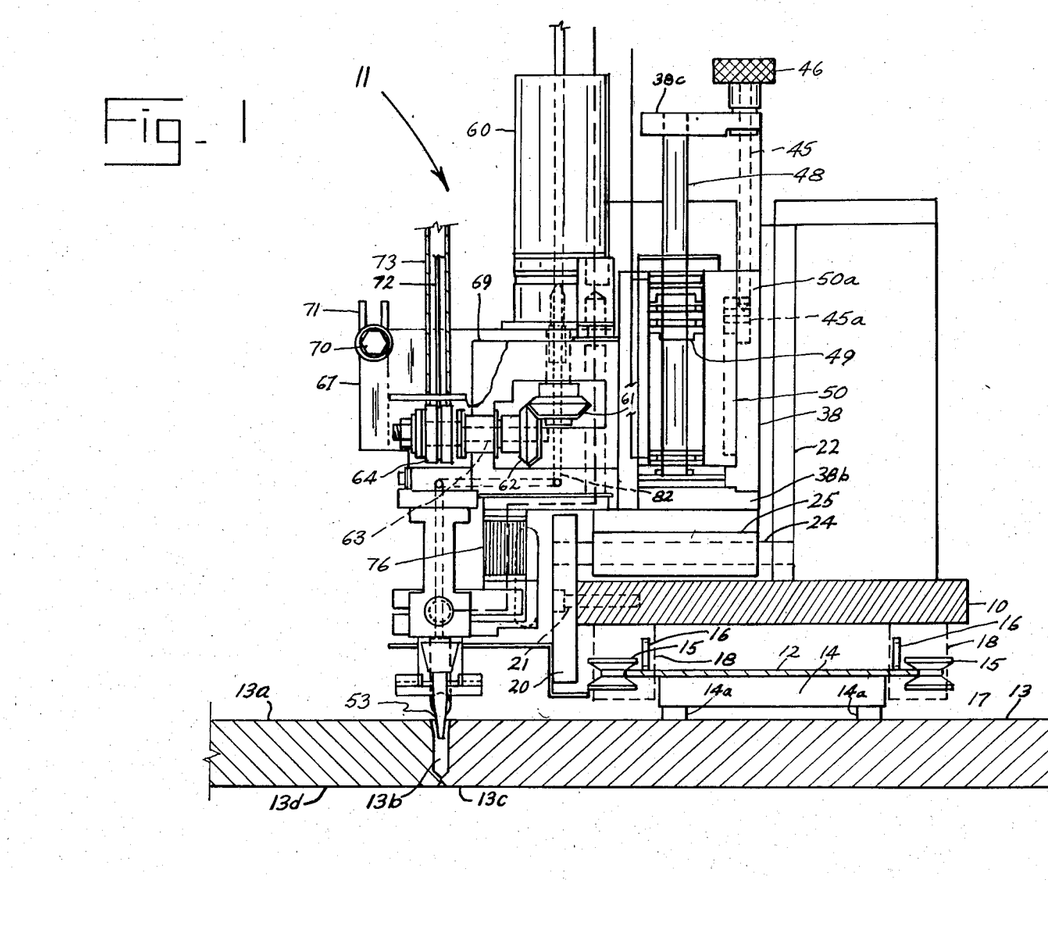
FIG. 1 is a side elevation showing a welding head apparatus of form according to the invention, and a support therefor, the drawing being partially in vertical cross section.

Referring now to the drawings in detail, and first to FIG. 1, a base plate 10 supports the welding apparatus 11. Base plate 10 may be a part of a welding carriage, as illustrated, or may be any support providing a surface for support of the welding head apparatus 11. As shown in the drawings, the plate 10 forms part of a welding carriage which is supported upon a track 12 in the form of a uniform thin metal strip supported about a pipe wall 13 by plural circularly spaced cross bars 14 and legs or lugs 14a. The base plate 10 is supported upon track 12 by sets of wheels including edge engaging wheels 15, which are grooved around their peripheries, and wheels 16 which engage the outer surface of the track 12. The wheels 15–16 are supported by support assemblies 18, indicated by dashed lines, the nature of which may be as desired. A second pipe wall 13a is abutted with pipe wall 13 at welding joint 13b between pipe ends 13c, 13d.

Figure 3:
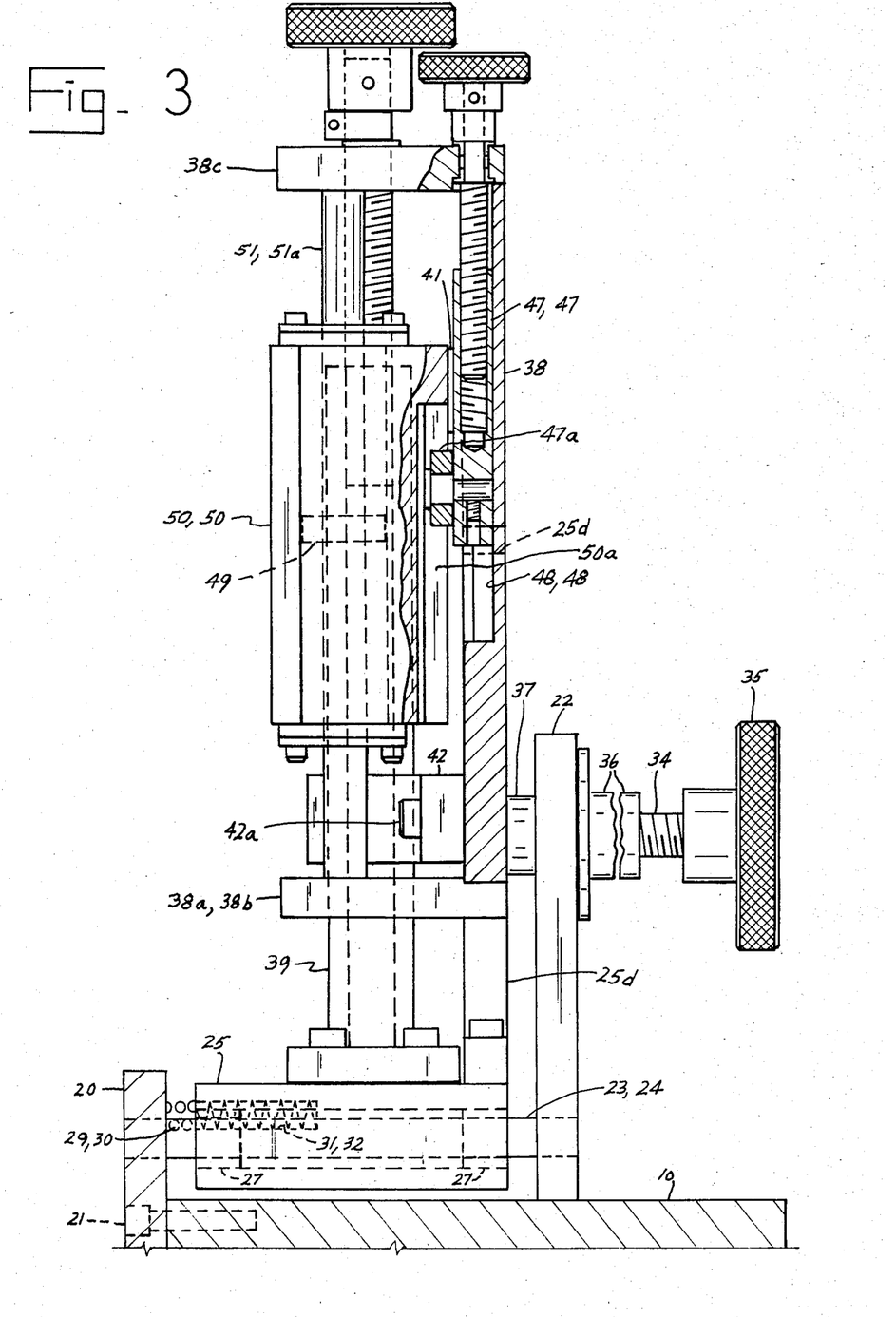
FIG. 3 is a front elevation of a support apparatus for the welding head shown in FIGS. 1–2, the welding head apparatus not being assembled thereon.
Figure 4:
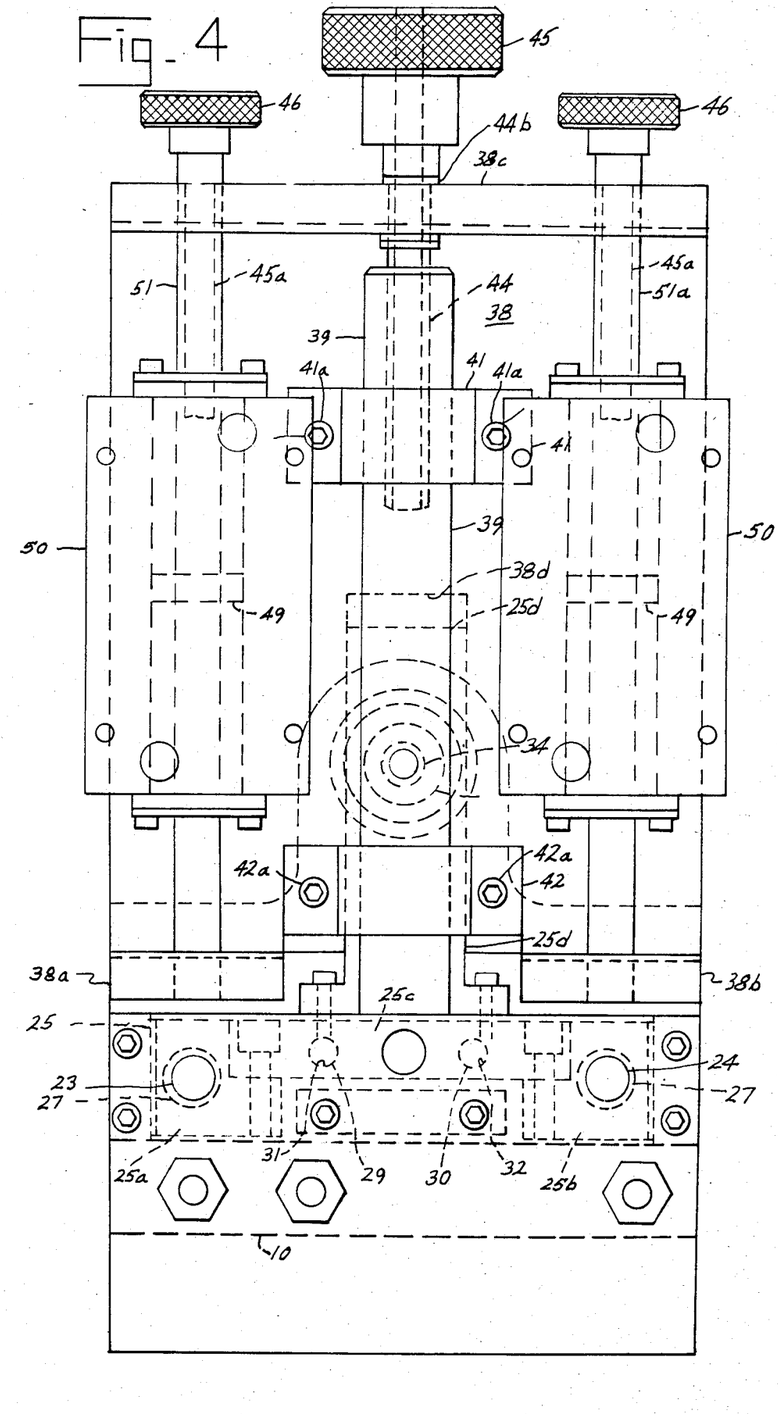
FIG. 4 is a side elevation of the support apparatus shown in FIG. 3.

An edge plate 20 is fixed along one side of base plate 10 by a plurality of spaced screws 21. A plate 22 is fixed in any suitable manner to be disposed perpendicularly above base plate 10 parallel to side plate 20. A pair of bars 23, 24 (see FIG. 4) slidably support a slide body 25 (FIG. 3) which is slidably movable along bars 23, 24 between plates 20, 22. Slide body 25 supports the welding assembly which is movable therewith. Slide body 25 is made up (FIG. 4) of two bars 25a, 25b of thick L-shaped form and crosspiece 25c which is screwed to the horizontal legs of elements 25a, 25b.

Sleeve bearings 27 (FIG. 3) are disposed about each cylindrical bar 23, 24 (FIG. 4), the sleeve bearings being fixed about straight cylindrical openings through the slide body 25. A pair of helical compression springs 29, 30 act between the bottoms of cylindrical recesses 31, 32, respectively, and plate 20, to bias slide body 25 toward side plate 22. A threaded plunger 34 having knob 35 is rotatable through fitting 36, internally threaded, to move plunger head 37 against upstanding key plate 25d. Key plate 25d extends upwardly from plate 25c and is slidable in slot 38d of plate 38 to guide up and down movements of plate 38 and to prevent rotation of plate 38 about shaft 39. When plunger 34 is rotated to be moved toward the left of FIG. 3, the force thereof overcomes the bias of springs 29, 30 to move slide body 25 toward the left (FIG. 3) and when plunger 34 is rotated to be moved toward the right (FIG. 3) the springs 29, 30 move slide body 25 toward plate 22.

Internally threaded tube 39 is slidably disposed through brackets 41, 42 secured to plate 38 by screws 41a, 42a, respectively, and is fixed at its lower end to crosspiece 25c. Bottom plates 38a, 38b are carried at the lower end of vertical plate 38, to move therewith, and a plate 38c is fixed to the upper end of plate 38, as shown. Cylinders 50, one to each side of tube 39, are supported in front of plate 38 on shafts 51, 51a, each fixed between top plate 38c and one of bottom plates 38a, 38b. Screw 44, journaled through top plate 38c, threadedly engages within tube 39, screw 44 extending through bearing 44b fixed through plate 38c. Therefore, rotation of screw 44 by rotation of knob 45 moves plate 38c and plates 38, 38a, and 38b upwardly or downwardly depending on the direction of rotation of knob 45 and screw 44.

Rotations of screws 45a by knobs 46 moves blocks 47 along slots 48 in plate 38, one adjacent each cylinder 50. Each block 47 carries a roller bearing 47a which is engaged in a slot 50a in the back of a cylinder 50. When a cylinder 50 is moved downwardly so that the bearing 47a reaches the top of the slot 50a, the downward movement of the cylinder 50 is stopped. Introduction of pressured fluid into each cylinder 50 below the piston 49 connected to a shaft 51 or 51a therewithin will move the cylinder 50 downward toward pipe 13. Introduction of pressured fluid into each cylinder 50 above the piston 49 will move the cylinder upward. Thus, each cylinder 50 may be moved independently toward or away from pipe 13, the movement toward pipe 13 being limited by the adjustable positions of blocks 47 carrying the roller bearings 47a. Therefore, each cylinder 50 may be moved upward away from pipe 13, and may be moved downward toward pipe 13, the dowward position being determined by the adjusted position of the bearing 47a. The welding heads are mounted on the cylinders 50, so that the welding heads may be moved away from the pipe and then returned to a selected downward position, repeatedly. In this way, the welding tip may be moved from and returned to its adjusted welding position without re-adjustment of screw 44 or either screw 45a.

The welding tip 53 (FIGS. 6–7) is supported by a block 53a at the end of a tubular shaft 53b which is disposed rotatably through a passage through a body 54. A crank arm 54a is connected to the end of shaft 53b at opening 54b and clamped by tightening screw 54c. The angular adjustment of tip 53 is accomplished by loosening screw 54c and rotating block 53a. Screw 55 engages arm 55a of crank arm 54a to adjustably limit its pivotal movement in one direction. In the other direction, pivotal movement of arm 55a compresses spring 55b and contacts the end of rod 55c. As should be abundantly clear, opening 54b forms a circular opening of the slot crossed by screw 54c.

Thus far, apparatus has been described by means of which the welding head may be moved transversely of the welding groove (sliding of slide body 25 on cylindrical rods 23, 24), by means of which the welding head may be raised and lowered with respect to the welding groove (threaded shaft 44 and cylinders 50), and by means of which the welding tip angularity may be adjusted with respect to the welding groove (loosening and retightening of screw 54c).

Figure 2:
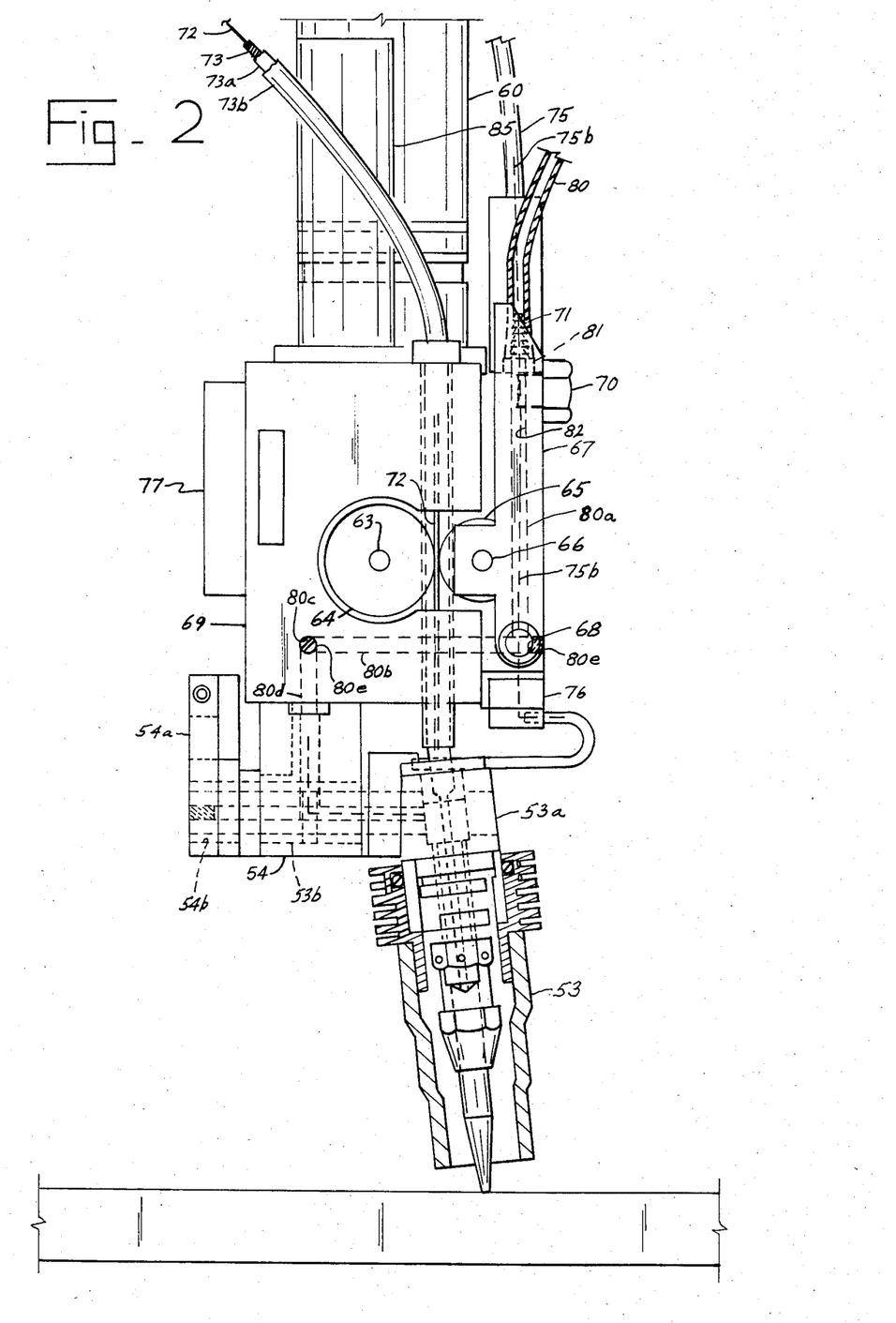
FIG. 2 is a rear elevation of the apparatus shown in FIG. 1.
Figure 5:
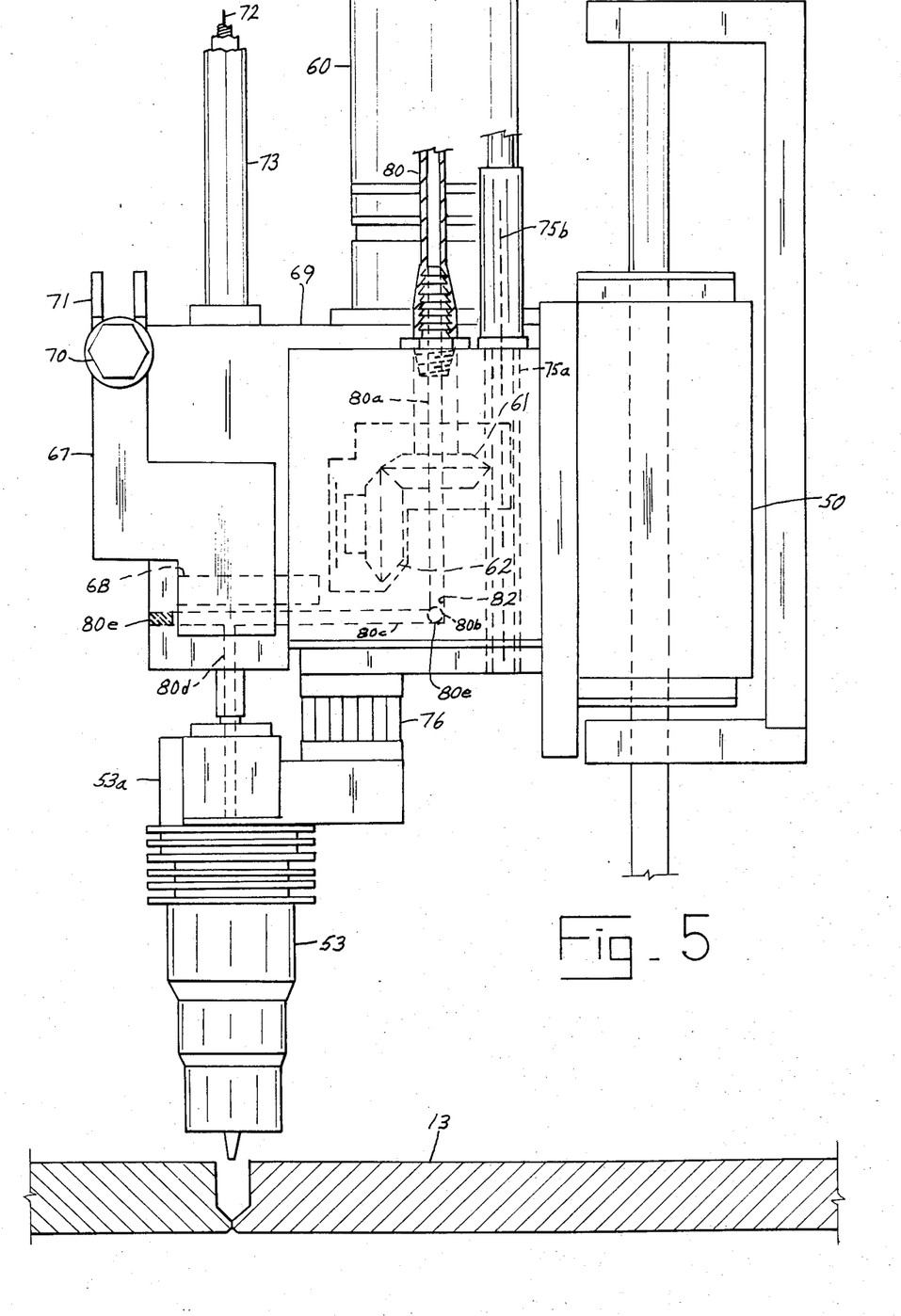
FIG. 5 is an enlarged partial front elevation showing elements of the apparatus shown in FIGS. 1–2.

An electric servo motor 60, mounted atop welding head body 69 which is connected to a cylinder 50 (FIG. 5), carries on its shaft a bevel gear 61. Gear 61 engages a second bevel gear 62, as best shown in FIGS. 1 and 5. Bevel gear 62 rotates a shaft 63 which rotates a wire feed drive roller 64 (see also FIG. 2). The welding wire is fed between roller 64 and an idler pressure roller 65 carried on shaft 66. Shaft 66 and roller 65 are carried by an arm 67 pivotally mounted on a pin 68 secured to welding head body 69. Adjustably spring biased screw arm 70 is engaged in yoke 71 of arm 67. When the screw arm 70 is pivotally moved upwardly out of yoke 71, arm 67 may be pivoted away from drive roller 64 to move pressure roller 65 away from drive roller 64, thereby releasing the engagement of the two rollers on the welding wire 72. Welding wire 72 is delivered to the drive and pressure rollers 64, 65 through a flexible welding wire guide tube 73 leading from a suitable spool of welding wire (not shown), the spool being supported on a suitable spindle supported by the apparatus in conventional fashion. An insulator sleeve 73a is disposed around guide tube 73, and an outer guide tube 73b is disposed around insulator sleeve 73a. Welding current is supplied to the welding tip through an electrical conduit 75 connected to an electrical connector body 76 (FIG. 2). An insulating sleeve 75a surrounds conductor 75 in a passage through body 69, the path thereof being indicated in FIG. 2 by dashed line 75b. The welding current is thus suitably insulated from the remainder of the apparatus in order that short circuiting and electrical shock to the operator(s) will be avoided.

Shielding gas for welding is supplied (FIG. 2) through a conduit 80 connected at fitting 81 to a passage 82 through body 69 leading to the interior of the welding tip (FIG. 2). The gas passes through intersecting bores 80a, 80b, 80c, 80d through body 69, the bore ends being plugged at 80e where the bores penetrate to the body exterior.

In another embodiment (FIG. 7), the shielding gas for welding is fed through the conduit 80, fitting 81, bores 80a, 80b, 80c, 80d, and an angular passage 82a into a tube 83 which is directed toward the welding tip. Thw two forms of welding tips are well known in the art, in one of which the gas passes through the tip assembly annularly around the tip and surrounding the arc formed at the end of the welding wire, and in the other of which the gas is passed through a separate tube directed toward the arc.

Figure 8:
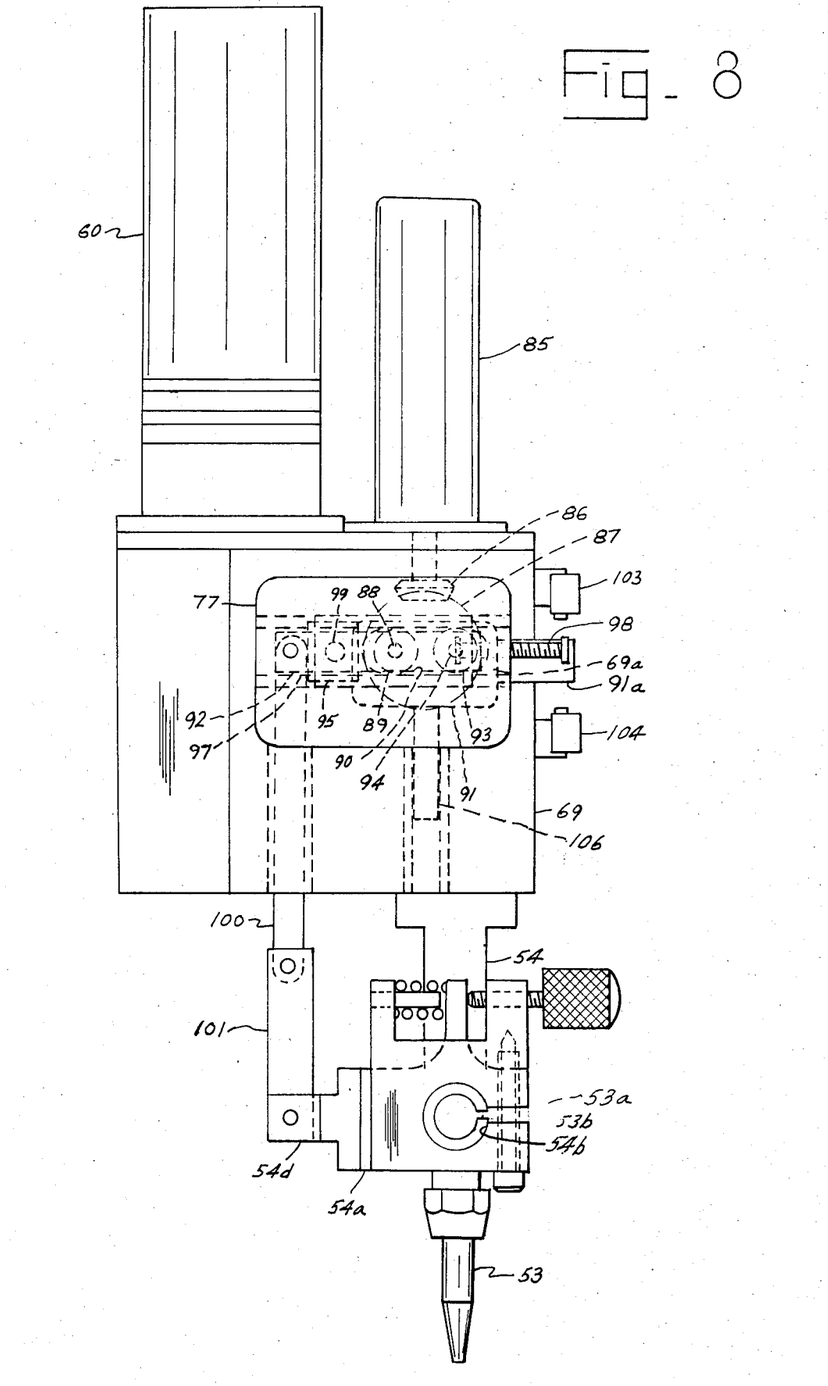
FIG. 8 is a side elevation showing the welding tip oscillator assembly.
Figure 9:
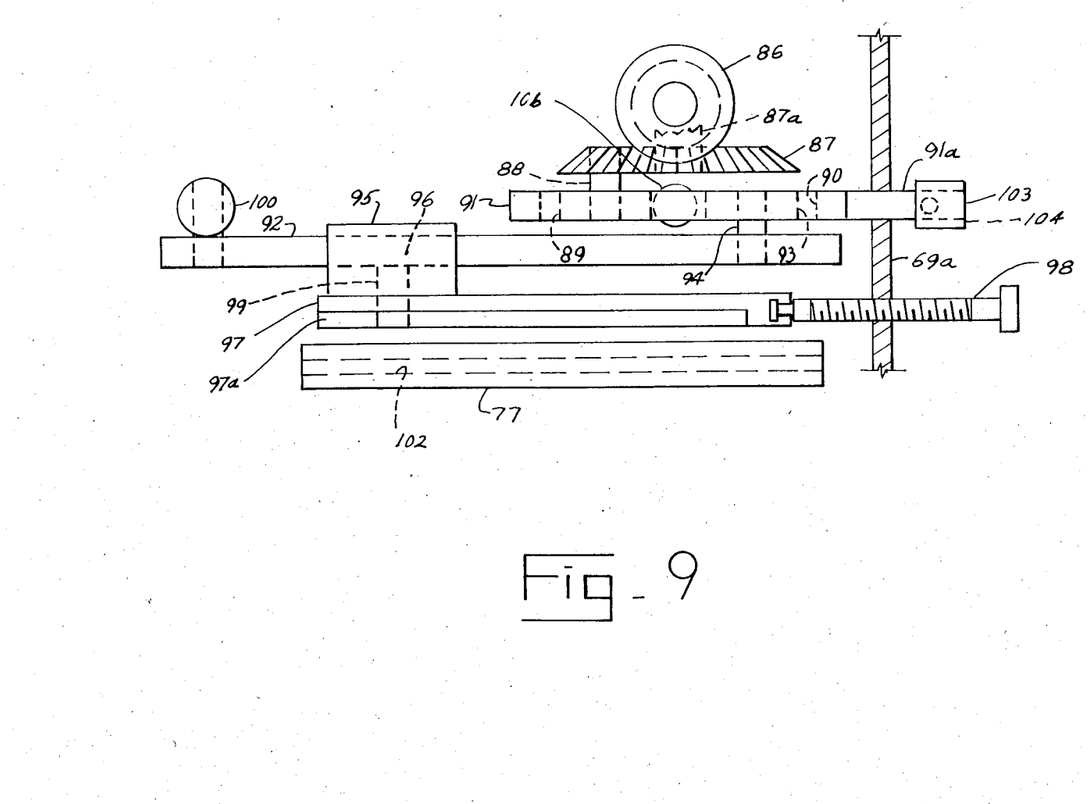
FIG. 9 is a schematic top view of the assembly shown in FIG. 8.

Referring now to FIGS. 8 and 9, there is shown a mechanism for oscillating the welding tip 53 transversely of the welding groove during welding in order to positively bridge the gap with the weld even though the groove may be somewhat non-uniform and wider than normal. An electric servo motor 85 mounted atop body 69 carries on its shaft a bevel gear 86. Gear 86 engages a larger bevel gear 87 mounted on a shaft 87a supported by body 69. Gear 87 carries a short shaft 88 disposed non-concentrically, and a roller 89 is rotatively disposed thereon. Roller 89 is disposed within a slot 90 through a plate 91. Arm 92 parallel to one side of plate 91 carries a second roller 93, also disposed in slot 90, roller 93 being supported on a short shaft 94 carried by arm 92.

A slide element 95 has a slot 96 of T-shaped cross section in which arm 92 is slidably disposed. Body 97 is engaged with a rotatable screw 98 which is threaded through a wall 89a of body 69. A pin 99 carried by slide element 95 and disposed through a cylindrical opening through body 97 creates a pivotal connection between elements 95, 97, arm 92 being pivotal with respect to element 95. By rotation of screw 98, the position of pivot pin 99 along arm 92 is moved or adjusted. A link bar 100 is pivotally connected transversely to the free end of arm 92, and extends to link 101 which in turn is connected to bar 54d of plate 54a (see FIG. 6).

Body 97 has a ridge 97a along its upper and lower sides, giving it a T-shaped cross section, and body 97 fits within a T-shaped slot 102 in cover plate 77 to be held stationary. Cover plate 77 is fixed to body 69 by suitable screws, not shown.

Bar 106, fixed to extend beneath plate 91, slides in a cylindrical passage in body 69, and limits movements of plate 91 to vertical movements.

Plate 91 has an extending arm 91a which is movably disposed between a pair of limit switches 103, 104 which control operation of servo motor 85. When arm 91a contacts the pin of one limit switch, motor 85 is caused to operate in one direction of rotation, and when arm 91a contacts the pin of the other limit switch, motor 85 is caused to operate in the other direction of rotation.

Because of switches 103, 104, gear 87 rotates only 45° in one direction, at which time arm 91a engages a limit switch 103 or 104 and the direction of operation of motor 85 is reversed and gear 87 is rotated 45° in the other direction, and so on, cyclically.

Figures 6, 7:
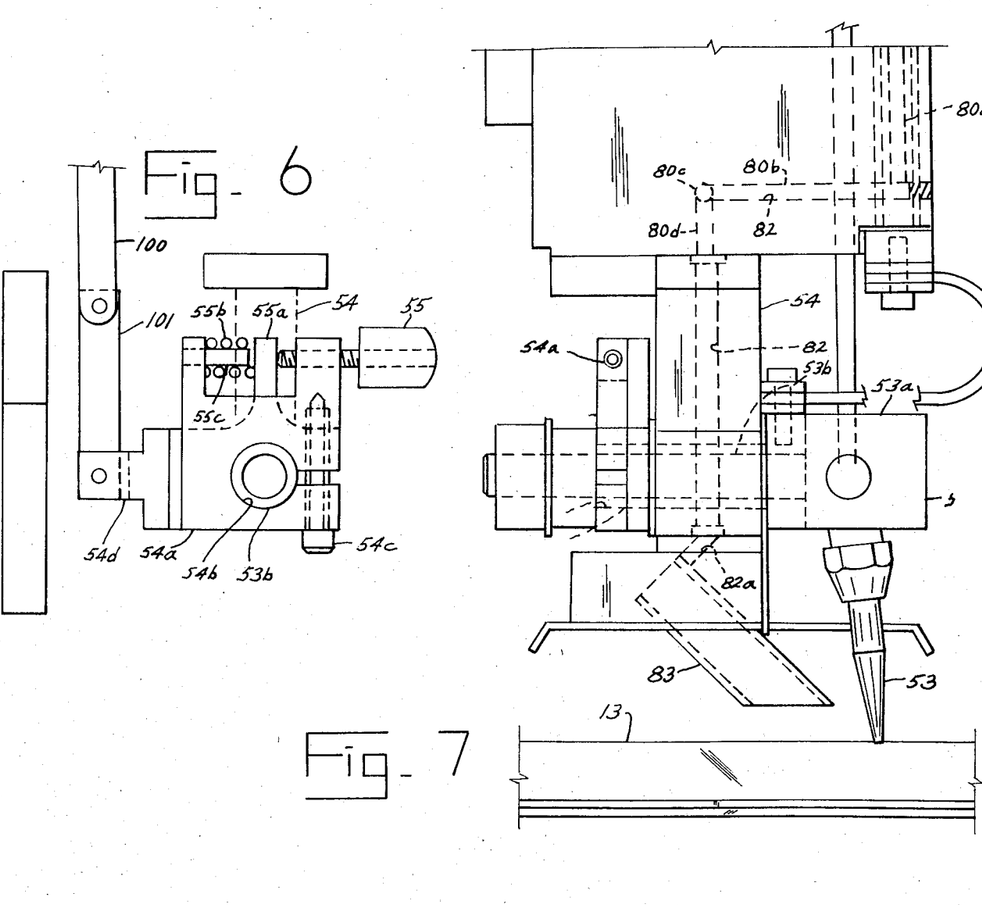
FIG. 6 is an enlarged partial elevation showing the welding tip angle adjustment assembly.
FIG. 7 is a side elevation of the apparatus shown in FIG. 6.

Plate 91 moves straight up and down as the result of the cyclic rotations of gear 87, plate 91 being moved up and down movements of roller 89 in slot 90. Roller 93, also in slot 90, transfers the up and down movements of plate 91 to the end of arm 92. Arm 92 pivots about pin 99, carried by slide element 95. Adjustment of screw 98 moves the pivot of arm 92 at pin 99, changing the extent of up and down movement of the left end of arm 92 (FIGS. 8-9) and changes the extent of the tip 53 oscillation (FIG. 6).

The disclosed apparatus is a substantial improvement over the prior art devices. The welding head is compact and self contained, providing a wire feeder, tip oscillator, and universal adjustment in a very compact unit. Adjustments are simple and easy to learn. The assembly is small enough that three or four units may be carried on a single welding earriage, and each unit is independently operable. Such a result has not heretofore been achieved.

While preferred embodiments of the invention have been described and shown in the drawings, many modifications may be made by a person skilled in the art without departing from the spirit of the invention, and it is intended to protect by Letters Patent all forms of the invention falling within the scope of the following claims.

I claim:

1. Welding head apparatus, comprising welding head body means, a welding tip having a shaft connected transversely thereof, a circular opening in said body means having a slot leading therefrom to a side of said body means, said circular opening having said shaft disposed therein, a screw across said slot for tightening said circular opening about said shaft, said shaft and welding tip being rotatably adjustable when said screw is loosened so that the angle of said tip with respect to a workpiece may be adjusted, passage means through said body means for delivering a gas to said welding tip, drive roller and idler roller means within said body means for delivering welding wire through said welding tip, and means for supplying welding current to said welding wire within said welding tip.

2. The combination of claim 1, said drive roller being driven by gear means driven in rotation by an electric motor.

3. The combination of claim 1, said welding tip being oscillated by reciprocating pivotal movements of an arm which pivots about a pin adjustably movable longitudinally of said arm, said pivotal movements of said arm being transmitted to said arm by a shaft of a roller disposed in a slot of a vertically movable body which is moved reciprocably vertically by a roller in said slot which is carried eccentrically by a gear driven in reversing reciprocating rotation by an electric motor the operation of which is reciprocatingly reversed by contact of limit switches by a bar carried by said movable body.

4. The combination of claim 3, one end of said arm being connected to a transverse bar linked to said body means to reciprocatingly pivot said body means about a pivotal mount thereof to oscillate said welding tip carried thereby.

5. The combination of claim 1, including a first bevel gear, an electric motor supported on said welding head body means and the rotative drive shaft of said electric motor extending into a cavity in said welding head body means and having said first bevel gear fixed thereon within said cavity, a second bevel gear engaging said first bevel gear driving said drive roller in rotation, said idler roller being carried by a pivotal support forming part of said welding head body means and being movable on said pivotal support toward and away from said drive roller and adapted to be pressured toward said drive roller, a welding wire disposed between said drive roller and said idler roller being propelled longitudinally to said welding tip.

6. The combination of claim 5, said welding head body means being carried by a support plate, means for moving said support plate vertically and means for moving said support plate horizontally.

7. The combination of claim 6, said means for moving said support plate vertically comprising screw adjustment means.

8. The combination of claim 7, said means for moving said support plate vertically also comprising fluid cylinder means.

9. The combination of claim 8, said fluid cylinder means being adapted to move said support plate vertically upward and to move said support plate vertically downward to its original position whereby readjustment of said screw adjustment means is not necessary each time said tip is to be moved upward vertically, and whereby said tip can be returned downwardly to a preselected position.

10. The combination of claim 6, said means for moving said support plate horizontally comprising slide rod means along which said support plate is horizontally slidable, screw means for driving said support plate along said slide rod means in one direction and spring means biasing said support plate in the opposite direction.

11. The combination of claim 10, including welding carriage means supporting said welding head apparatus, said welding carriage being disposed on a track fixed about the end of a pipe supported to be abutted with the end of another pipe to be welded thereto, said tip being movable vertically to and from the joint between said pipe ends and being movable transversely of said joint and the angle of said tip in the plane of said joint being adjustable, by the apparatus herein described, so that welding of said joint with said tip may be adequately controlled.

12. Welding head apparatus, comprising a horizontal support plate disposed above a weld joint of a workpiece, means including fluid cylinder means for adjustably moving said support plate vertically toward and away from said workpiece, said horizontal support plate being slidably supported on spaced parallel horizontal shafts and being spring biased in one direction along said shafts, means for adjustably moving said horizontal support plate horizontally against said spring bias, a welding head disposed upon said horizontal support plate, said welding head including a welding tip directed toward said workpiece and movable with said horizontal support plate, means for adjusting the angle of said tip with respect to said workpiece, means incorporated in said welding head for feeding welding wire to said tip, and means for oscillating said tip in a direction transverse to the direction of said angular adjustment.

13. The combination of claim 10, said means for adjusting the angle of said tip comprising releasable clamp means within which said tip may be rotated when the clamping force is released, said means for feeding welding wire comprising an electric motor having a bevel gear fixed to its shaft and being engaged with a second bevel gear having a shaft on which a drive roller is fixed, a pressure roller pivotally movable toward said drive roller whereby a welding wire disposed between said rollers may be driven in one longitudinal direction by rotation of said drive roller by said motor.

14. The combination of claim 13, said top being pivotably clamped to said welding head body, and including means for pivotally oscillating said tip transversely of said workpiece joint.

15. The combination of claim 14, said means for moving said support plate vertically comprising screw adjustment means.

16. The combination of claim 15, said fluid cylinder means being adapted to move said support plate vertically upward and to move said support plate vertically downward to its original position whereby readjustment of said screw adjustment means is not necessary each time said tip is to be moved upward vertically, and whereby said tip can be returned downwardly to a preselected position.

17. The combination of claim 14, including welding carriage means supporting said welding head apparatus, said welding carriage being disposed on a track fixed about the end of a pipe supported to be abutted with the end of another pipe to be welded thereto, said tip being movable vertically to and from the joint between said pipe ends and being movable transversely of said joint and the angle of said tip in the plane of said joint being adjustable, by the apparatus herein described, so that welding of said joint with said tip may be adequately controlled.

* * * * *